Dec. 24, 1946. L. A. MAXSON 2,413,027
CABIN PRESSURE CONTROLLING MECHANISM
Filed June 9, 1943 3 Sheets-Sheet 2

Inventor:
Luis A. Maxson.

Dec. 24, 1946. L. A. MAXSON 2,413,027
CABIN PRESSURE CONTROLLING MECHANISM
Filed June 9, 1943 3 Sheets-Sheet 3

Inventor:
Louis A. Maxson

Patented Dec. 24, 1946

2,413,027

UNITED STATES PATENT OFFICE 2,413,027

CABIN PRESSURE CONTROLLING MECHANISM

Louis A. Maxson, Claremont, N. H., assignor to Joy Manufacturing Company, a corporation of Pennsylvania Application June 9, 1943, Serial No. 490,170

11 Claims. (Cl. 98—1.5)

My invention relates to pressure controlling apparatus, and more particularly to apparatus for controlling the pressures in the cabins of airplanes.

High altitude flight is possible as a practical matter only with enclosed cabins in which the pressure is artificially maintained at values above the values which subsist outside the cabin. In order that the cabin pressure can be maintained, it is customary to provide devices for pumping air from outside the cabin into the latter, and since it is difficult, if not impossible, to maintain a sufficiently close regulation of the pumping apparatus to maintain the desired pressure differences, automatically controlled outflow valves are essential.

After takeoff it is possible to permit the pressure in the cabin to drop substantially in the same way that the external pressure falls with increasing height, until certain heights are reached, such for example as 8000 feet and still maintain the ultimate cabin pressure not too uncomfortable, but in fast-climbing planes it is preferable to prevent the cabin pressure from reducing as rapidly as the reduction in external pressure occurs, this for the greater comfort of the cabin occupants. It has been found highly desirable from a height of the order of 8000 feet to some considerably higher altitude, such as perhaps 35,000 feet, to cause the cabin pressure to remain approximately at that value which corresponds to the selected lower altitude, for example 8000 feet. It is also desirable that above the higher selected limit, for example 35,000 feet, there be a progressive reduction in cabin pressure as the plane goes still higher, this in order that there may be less power consumed in pumping air and that the range of compression be kept within desired limits, preferably below 4 to 1.

In addition to the desirable functions just explained it is desirable to provide means whereby the cabin pressure may be adjusted at will to increase the pressure above that which normally exists at the altitudes of sustained flight. For example, if a plane were going to land at an airport at an elevation of several thousand feet above sea level and it was necessary for it, in order to approach the airport from the direction in which it was coming, to pass over a range of considerable height just before the port is reached, the plane must either make a considerable flight beyond the desired point of landing in order that an unpleasantly rapid increase in cabin pressure may not be encountered, or else the plane must be provided with means by which the cabin pressure may be caused to rise over a considerable period in advance of the arrival at the port, this latter expedient involving both the provision of an adjustment for increasing the cabin pressure and also preferably means for limiting the rate of increase from the previously maintained pressure level to the pressure level which is predetermined by the adjusting means.

It is an object of my invention to provide an improved automatic pressure control system for airplane cabin pressures. It is another object of my invention to provide an improved automatic pressure controlled mechanism. It is still another object of my invention to provide an improved cabin pressure controlling apparatus having improved means for limiting the rates of cabin pressure changes. It is a further object of my invention to provide an improved cabin pressure control system having improved means controlling the rates of cabin pressure change both during increases and during decreases in cabin pressure. It is another object of my invention to provide an improved cabin pressure controlling apparatus having improved means for permitting the fall of cabin pressure during an initial rise in elevation of a predetermined amount and having improved means associated therewith whereby the rate of reduction in cabin pressure may be held below the rate of diminution of the external pressure if the rate at which the plane rises exceeds a predetermined one. Still another object of my invention is to provide an improved cabin pressure control system having improved means whereby the cabin pressure may be deliberately increased while the plane continues to operate at or above a level where the outside pressure is below or at least not above the existing cabin pressure at the time the cabin pressure increase is initiated. And it is a subsidiary object to provide an improved control whereby the rate of cabin pressure increase may be held within the range of comfort or within such other range as expediency may dictate. It is still another object of my invention to provide an improved control system for cabin pressures incorporating improved apparatus for maintaining substantially uniform cabin pressure conditions during flight between predetermined altitudes, for automatically maintaining a predetermined ratio between cabin and external pressures when the higher one of said predetermined altitudes is exceeded, for holding the rate of reduction in cabin pressure within predetermined limits, as for example to about one inch of mercury per minute, for providing for deliberate increase in the cabin pressure when desired while still maintaining automatic control through the controlling apparatus, and automatically limiting the rate of pressure rise during such periods of deliberate cabin pressure increase to a rate suited to the comfort or needs of the cabin occupant, as for example by maintaining the rate of pressure increase at values not exceeding, say, .30 inch of mercury per minute. It is still another object of my invention to provide an improved automatic cabin pressure control system in which use is made of the relative rate of change between cabin pressure and pressure in a tank having communication with the cabin through a very small orifice (the size of the orifice is variable with the size of the tank, but the tank should preferably be small in view of the space requirements of airplane design) to govern the rate of cabin pressure change, and desirably both the rate of increase and the rate of decrease.

My invention may advantageously be employed, in a preferred embodiment thereof, in a system which includes an expansible-chamber-device-controlled cabin pressure vent valve, and automatic controlling means for the expansible chamber device which controls said vent valve, said automatic controlling means including means for feeding pressure to the device from the cabin and venting pressure from the device to the exterior of the cabin. Desirably a plurality of controls for the purpose of shifting connections of the device between the exterior of the cabin and the interior thereof are provided, including an adjustable expansible device, desirably in the form of an evacuated bellows having means associated therewith for varying the action of the bellows under cabin pressure variation, and an additional device responsive to the differential in pressure between the inside of the cabin and the outside thereof for causing reduction in cabin pressure upon the exceeding of certain relatively high elevations, such devices having associated therewith improved means in the form of a valve device governed by the differential between cabin pressure and the pressure in a tank having restricted communication with the interior of the cabin and performing the dual function of restricting the rate of cabin pressure reduction during the period between takeoff and the attainment of a so-called pressurizing elevation, say 8000 feet, and limiting the rate of rise of cabin pressure when the evacuated bellows first above mentioned has its responsiveness to cabin pressure deliberately altered in a manner to cause an increase in pressure.

In the accompanying drawings, in which a preferred embodiment of my invention has been shown for purposes of illustration.

Figures 1, 2, 3, 4:
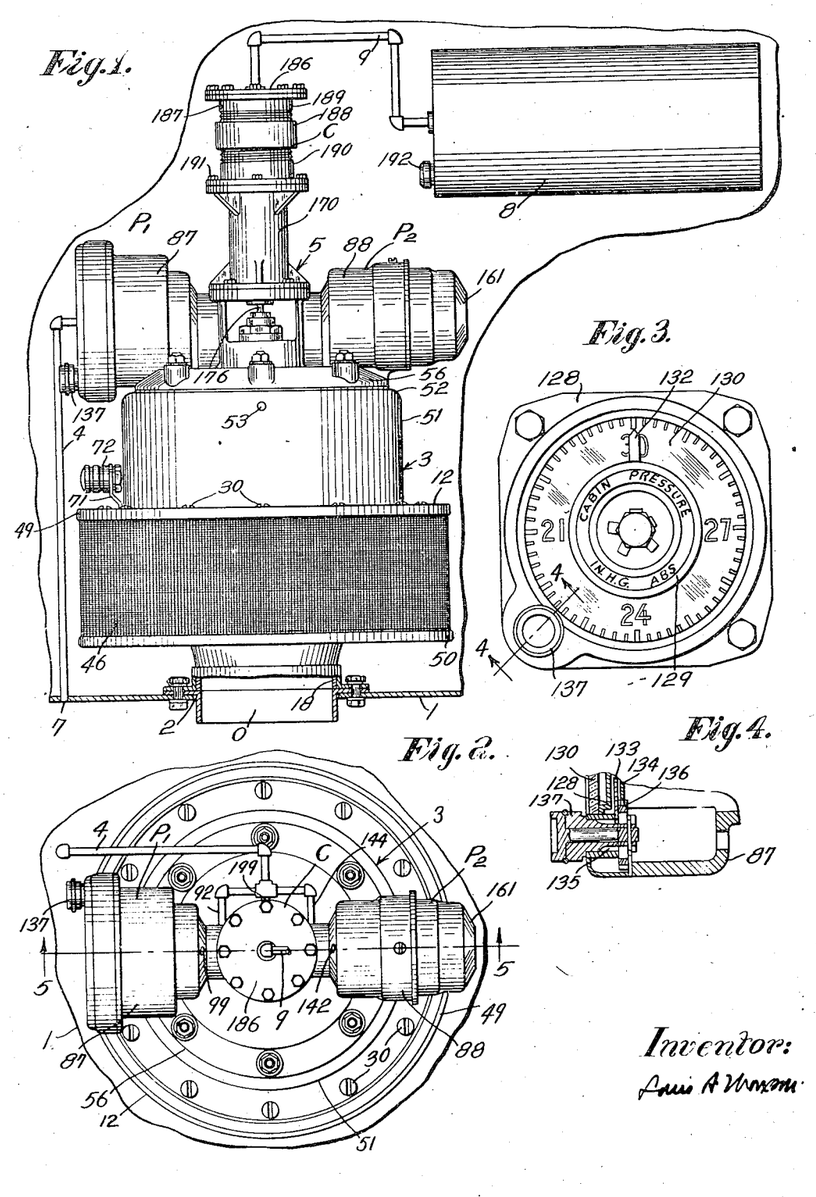
Fig. 1 is a diagrammatic view showing in elevation the cabin vent valve, the controlling mechanism, and the tank hereinabove mentioned.
Fig. 2 is a top view of the automatic control valve mechanism.
Fig. 3 is an enlarged end elevational view of a portion of the automatic control valve mechanism.
Fig. 4 is a fragmentary detail sectional view on the plane of the line 4—4 of Fig. 3.

Referring now to the drawings, and first to Fig. 1, it will be noted that the wall 1 represents the wall of an airplane cabin, and this wall is traversed by an opening 2 over which there is mounted a cabin vent valve mechanism generally designated 3. This vent valve mechanism is of an expansible-chamber-device-operated type, and the venting of the cabin is controlled by the transmission of cabin pressure to the mechanism 3 and by the venting of pressure to the exterior of the plane from the mechanism 3 through a conduit 4. The conduit 4 is under the control of a pilot valve mechanism, generally designated 5, and the conduit 4 communicates with an atmospheric vent 7 opening through the wall of the cabin. A tank 8 is connected by a conduit 9 with the pilot mechanism 5, and the rate of change of pressure within the tank is restricted as will be later explained; and the pilot mechanism 5 is automatically operative to preclude the existence of differences in excess of certain predetermined values between cabin pressure and tank pressure, whereby the rate of change of cabin pressure may be held within at least safe, and desirably comfortable, values.

While the present invention may be embodied in other constructions from those illustrated, it has been shown for the purposes of this application as incorporated in a mechanism following closely in many respects the arrangement disclosed, described and claimed in the Win W. Paget application Serial No. 453,860, filed August 6, 1942.

*Cabin vent valve mechanism*

Figures 5, 6, 7:
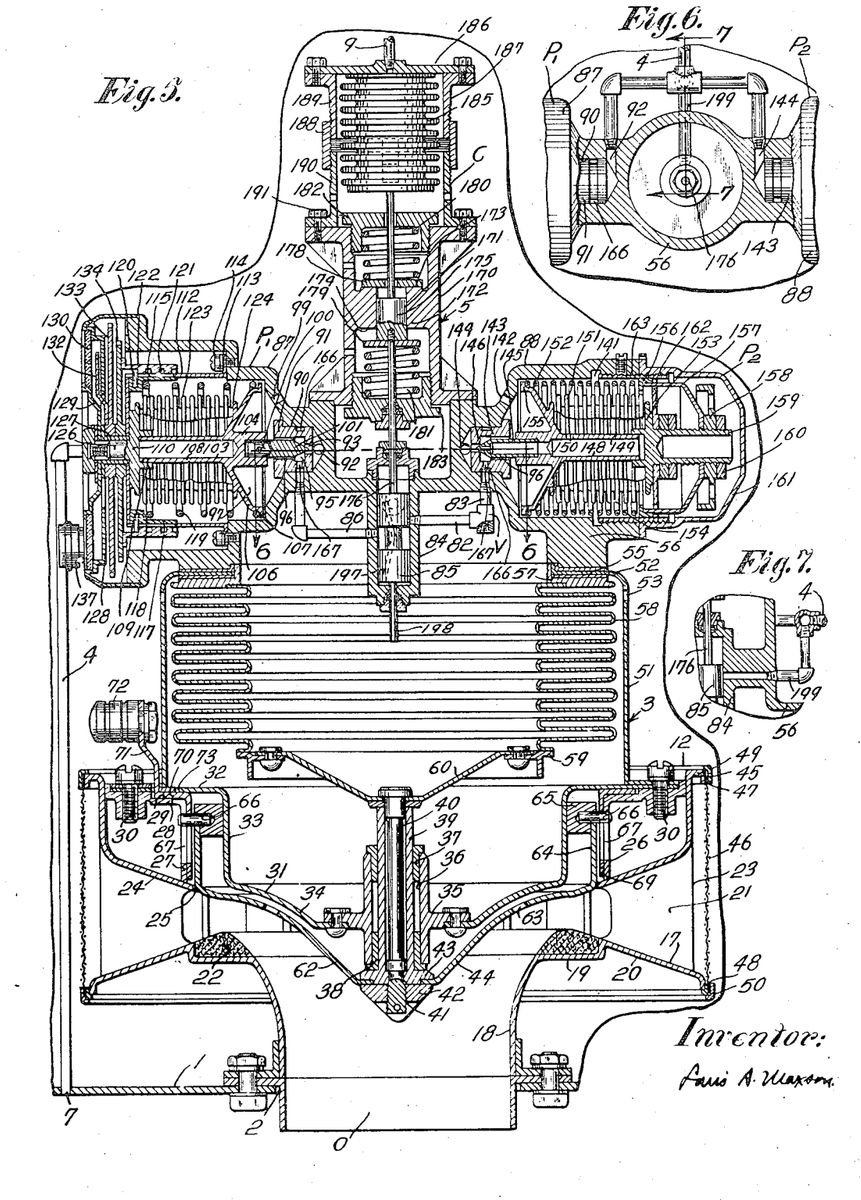
Fig. 5 is an enlarged vertical sectional view on the plane of the line 5—5 of Fig. 2, through the cabin vent valve and the controlling valve mechanism therefor.
Fig. 6 is a fragmentary horizontal sectional view substantially on the plane of the line 6—6 of Fig. 5.
Fig. 7 is a fragmentary vertical sectional view on the plane of the line 7—7 of Fig. 6.

The structure of the cabin vent valve is particularly disclosed in Fig. 5, and this vent valve corresponds quite precisely in construction with the vent valve disclosed in the application of Win W. Paget, Serial No. 452,925. It comprises a stationary casing 12 mounted over the opening 2 in the wall of the cabin. The casing 12 includes a lower annular portion 17 which is made with a tapering discharge-orifice-providing portion 18 and which opens into communication with a vent port O. The portion 18 is surrounded by an annular valve seat supporting surface 19 and an outer frusto-conical portion 20 which forms the lower boundary for a generally annular passage 21 communicating with the interior of the cabin. A suitable valve seat element 22 of fiber or similar material is mounted on the seat supporting surface 19. Supported by suitable webs 23 on the portion 20 is an upper annular wall 24 surrounding at its lower end a circular opening 25. A member 26 comprising an approximately cylindrical annular portion 27 and an approximately radial flange portion 28, is welded to the annular wall 24 respectively near the opening 25 and near the uppermost part of the wall member 24. The radial flange portion 28 provides a seating surface 29. The member 26 also has bosses for receiving bolts 30 for holding the parts in assembled relation. Supported on the seating surface 29 is a casing member 31 comprising a flange 32 resting on the surface 29, a cylindrical wall 33 coaxial with the discharge orifice O, and finally a tapering downwardly projecting wall portion 34 connected to a guide supporting element 35 having a bore 36 in which upper and lower sleeves 37 and 38 are mounted and serve to guide a tubular stem 39 to which the vent valve later described is attached. A suitable bolt 40 extends through the sleeve 39 and has its head engaging the lower end of a bellows device later described, to clamp said end against the sleeve 39, and has a lower threaded extremity 41 engaged by a nut 42 which clamps the central portion of a vent valve 44, later more fully described, against an enlarged head 43 on the sleeve 39. The extreme upper end of the upper annular wall 24 is provided with an outwardly flared flange portion 45 which coacts with the wall portion 20 to bound the annular opening 21 through which fluid enters the valve casing from the interior of the cabin. A suitable screen 46 engages cylindrical portions 47 and 48 at the outer edges of the casing portions 24 and 17 to prevent the access of material which might damage the valve mechanism, to the interior of the latter. Any suitable holding rings, such as 49 and 50, may be used to maintain the screen in place. Also supported by the seating surface 29 but resting on the flange 32 is a top casing member 51 rounded inwardly, as at 52, at its upper end and having perforations 53 therethrough so that the cabin pressure may attain freely to the interior of the member 51. The upper end of the member 51 includes an inwardly directed annular portion 55 which supports a housing structure generally designated 56. To the lower side of the flange 55 is brazed or otherwise suitably held a top support element 57 to which there is secured a bellows device 58 whose lower end is attached through an annular attachment member 59 to a conical member 60. The member 60 is secured between the head of the bolt 40 and the top of the sleeve 39.

Figures 8, 9, 10, 11, 12:
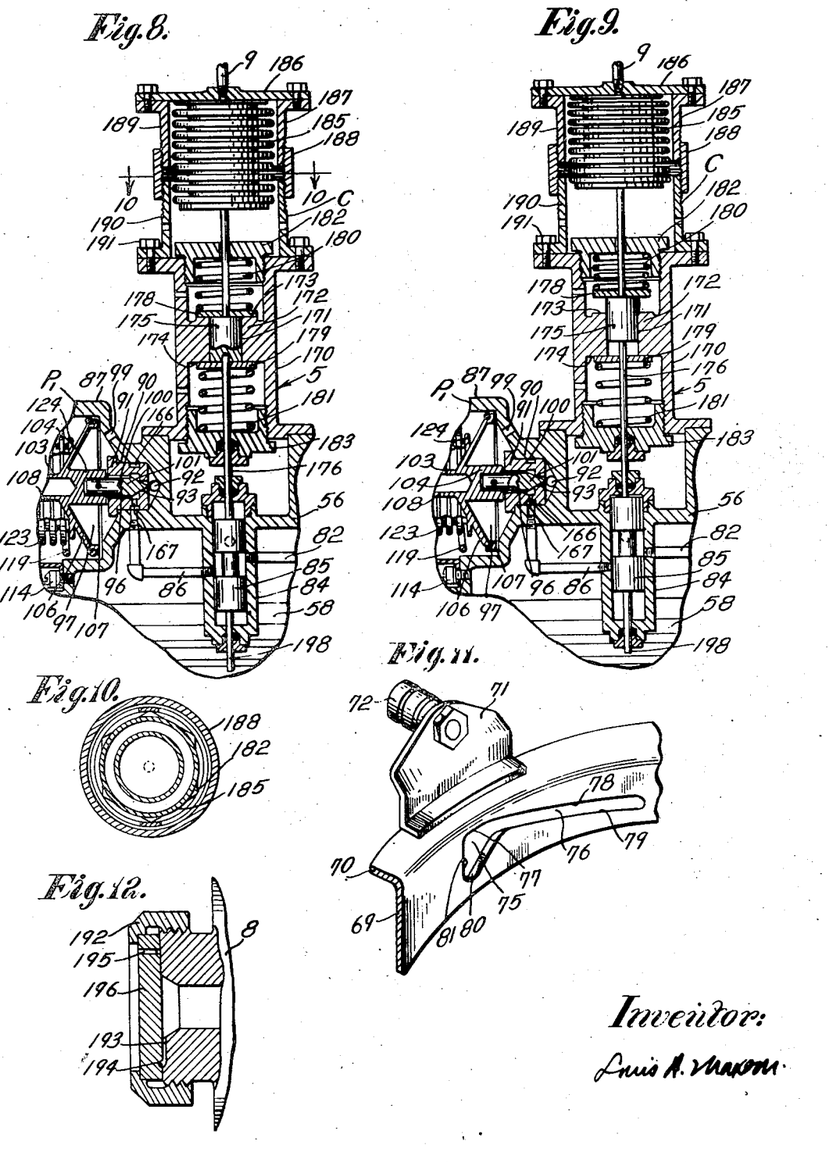
Figs. 8 and 9 are fragmentary views showing portions of the control mechanism in different operating positions.
Fig. 10 is a transverse sectional view on the plane of the line 10—10 of Fig. 8.
Fig. 11 is a fragmentary view in perspective showing a detail of construction of the manual control and de-icing device for the cabin vent valve.
Fig. 12 is an enlarged fragmentary sectional view showing the arrangement for maintaining a restricted connection between the interior of the cabin and the interior of the tank.

The vent valve 44 includes a relatively conical portion 62 perforated, as at 63, so that the pressure may be similar on opposite sides thereof, and has at its outer edge a cylindrical sleevelike portion 64 to which there is secured a ring 65 guided on the outer wall of the cylindrical portion 33. Projecting outwardly from the cylindrical portion 64 are pins 66 extending through vertical slots 67 in the annular cylindrical wall 27. Between the wall 64 and the wall 27 there is rotatably mounted a cylindrical member 69 having a radial flange 70 to which there is welded an upstanding operating flange portion 71 carrying a button or finger-piece 72. The portion 71 moves in an arcuate slot 73 in the flange 32. The cylindrical member 69 is traversed, as shown in Fig. 11, by a series of openings each including a relatively right triangular portion 75 and a communicating helically extending elongated portion 76. The top wall 77 of the portion 75 lies in a plane perpendicular to the axis of the mechanism. The top and bottom walls 78 and 79 of the helically extending portion 76 extend obliquely downward. The lower wall of the portion 75 is relatively sharply upwardly inclined, as at 80. The end wall of portion 75 is vertical, as at 81. Now, it will be evident that by turning the member 69 counterclockwise in terms of directions looking down upon the valve device, and causing the helically disposed portions 76 to engage the pins 66, the valve 44 may be adjusted to and held in substantially any desired position. It will further be observed that when the member 69 is left in the position indicated in Fig. 5, the valve may move freely up and down without interference from this member. It will also be evident that when the valve is nearly closed or quite closed, if the same becomes stuck by ice or the like the surface 80 may be used to wedge up the valve and because of its steepness can be used to cause the valve to reciprocate rapidly and thus to free it from ice.

The mode of operation of the mechanism so far described is as follows. The position of the valve 44 with respect to its seat 22 depends upon the pressures respectively inside the bellows device 58 and outside of it. The pressure inside of the bellows device is variable and is controlled as will shortly be described, by regulating the flow between the interior thereof and the interior of the cabin and the exterior of the cabin. The pressure surrounding the bellows device 58 is also variable, as the cabin pressure is not maintained constant and the space surrounding the bellows is in free communication through the ports 53 with the interior of the cabin. The provisions for the control of the pressures within the bellows 58 may now be described.

The control mechanism for the cabin pressure vent valve

The control mechanism for the cabin vent valve 44 which exerts its control on said valve through the introduction of pressure into and the bleeding of pressure from the interior of the bellows device 58 includes two pilot devices $P_1$ and $P_2$ and a control device C. The housing structure 56 will be observed to form a closure for the top of the bellows device 58, and the sole external communication from the interior of the bellows is by way of the conduit V. This conduit includes branches 82 and 83 and at the apex of its V opens into the interior of the bellows device 58. The branch 83 leads to the pilot valve device $P_2$. The branch 82 leads to a valve casing 84, herein shown as integral with the housing 56; and communicates, under the control of a piston-type control valve 85, at times with a conduit 86 which leads to the pilot device $P_1$. The pilot devices $P_1$ and $P_2$ are disposed in casings 87 and 88 respectively, which are herein shown as formed integral with the housing 56.

The pilot mechanism $P_1$

The housing 87 at its end toward the axial line of the bellows device 58 is provided with a bore or chamber 90 in which a valve-seat-providing element 91 is mounted. The inner end of the bore 90 communicates through a conduit 92 with the connection 4 leading to the exterior of the cabin. The valve-seat-providing element 91 is traversed at its innermost end by a passage 93 which communicates with the portion of the bore 90 to which the conduit 92 leads. Within the element 91 there is an internal chamber 95 into which the passage 93 opens, and the element 91 has a considerably larger passage 96 arranged coaxial with the passage 93 and opening into a space 97 within the housing 87 and connected by a port 99 with the space within the cabin whose pressure is to be controlled. A pilot valve element 100 extends, with clearance about it, through the passage 96 and has a conical point 101 adapted to coact with the walls of the passage 93 and interrupt communication through that passage between the conduit 92 and the chamber 95 within the element 91. The pilot valve 100 is mounted in any suitable manner permitting a limited freedom of motion at the extremity of a valve carrying element 103 which comprises a forward portion 104, in which the valve 100 is supported, a relatively wide circular flange portion 106 having a spring-engaged peripheral shoulder 107 and a stem portion 108 guided in a bore 109 in a head member 110. Within the housing 87 there is a generally cylindrical sleeve member 112 supported by an end flange 113 and machine screws 114 in the housing 87 in coaxial relation with the element 91, and having a series of parallel slots 115 extending longitudinally thereof from its outer end. Within this sleeve there is slidable a spring follower sleeve 117 providing a shoulder 118 engaged by the outer end of a spring 119, the inner end of the spring 119 engaging the shoulder 107. Pins 120 are carried by the follower sleeve 117 and extend through the slots 115 and are received at their outer ends in an internal helical groove 121 in a spring compression adjusting sleeve 122. An evacuated bellows 123 is mounted at one end on the head member 110, to which it has a hermetically sealed connection, and at its other end is connected in hermetically sealed relation to a flange 124 formed integral with the larger flange 106. Mounted on a reduced projection 126 on the head member 110 is the sleevelike portion 127 of a plate 128 bearing calibrations, and another and outer plate 129 coacts with the plate 128 in providing a mounting for a sight glass panel 130 through which there may be observed the legends on the plate 128 and the position of a pointer 132. The pointer 132 is secured to a gear element 133, and the spring tension adjusting sleeve is secured to a somewhat smaller gear element 134, and these two gear elements may be jointly turned, as shown in Fig. 4, by coacting pinions 135 and 136 actuated by common turning means 137. As a number of rotations of the sleeve 122 are necessary to effect a movement of the pointer 132 through a single turn, this gear and pinion arrangement is provided. Its details are more fully described in the copending application to Win W. Paget, Serial No. 453,860, earlier mentioned.

The mode of operation of this device P₁ will be readily apparent. It will be evident that the evacuated bellows 123 upon which cabin pressure acts exteriorly will tend to remain collapsed until such time as cabin pressure falls enough so that the spring 119 can expand the bellows. The spring will possess this capacity at a cabin pressure corresponding to eighteen inches of mercury when the spring is relatively uncompressed, but when the spring is considerably compressed by movement of the spring compression adjusting sleeve 117 to the right in Fig. 5, the evacuated bellows will be expanded by the spring in a manner to close the valve 100 at a considerably higher cabin pressure—one equivalent, say, to twenty-seven inches of mercury in a certain adjustment of sleeve 117. In any event, the pilot, or the stewardess, or anyone else in charge in the plane, can vary the compression of the spring 119 as desired, and the pilot device P₁ will tend to maintain an absolute cabin pressure approximately uniform at whatever value the spring 119 is set for. Whenever the pilot valve 100 is open, the valve 44 will tend to open; whenever it closes the valve 44 will tend to close, this, of course, if the conduit 86 is continuously in communication with the conduit V. If the pilot desires to have the cabin pressure altered, he can do this simply by turning the device 137, and in the absence of mechanism other than has been described, this change in cabin pressure may be uncomfortably and even dangerously, rapidly effected. One means for controlling the rate of cabin pressure change is disclosed and claimed in the Paget application first above mentioned. My improved arrangement for effecting such a control will be explained shortly.

*The pilot mechanism P₂*

The pilot mechanism P₂ includes the casing 88, as above noted, this casing having a hollow interior providing a chamber 141 which communicates through a passage 142 with the interior of the cabin. A valve seat providing element 143, herein in all respects the same as the valve seat providing element 91, is mounted in coaxial relation with the chamber 141. A passage 144 provides an atmospheric connection from the space to the left of the valve seat element 143 in Fig. 5. Instead of employing a solid pilot valve identical with the pilot valve element 100, the pilot mechanism P₂ includes a hollow pilot valve element 145 whose point is traversed by a port 146 which constantly maintains a communication between the exterior of the cabin and a bore 148 in a stem portion 149 which carries the pilot valve 145. The construction of the stem portion 149 is in all respects essentially the same as that of the stem portion 103, except that a radial port 150 connects the bore in the stem portion with the interior of a bellows device 151 which is mounted between an annular flange 152 carried by the stem and a stationary head member 153 which guides the stem 149. Accordingly, the interior of the bellows device 151 is subjected at all times to exterior pressure, i. e. pressure outside the airplane. A spring 154 engages a flange 155 on the flange 152 and at its other end engages a follower 156 whose position is adjustable by a finger-providing element 157 which can be moved to various positions and there locked by means of an internally threaded adjusting element 158 coacting with the threaded stem 159 carried by the head member 153, and by a lock nut 160. A cap 161 is supported by a threaded sleeve 162 which is fixed in the internally threaded outer end of the casing portion 88 as at 163. This device obviously maintains the pilot valve member 145 seated until external pressure falls off to a relatively low value, perhaps such a value as would be obtained at a height of 35,000 feet, and above that elevation this mechanism will operate to maintain a constant differential in pressure between cabin pressure and external pressure.

Each of the valve seat elements 91 and 143 is provided with a peripheral groove. The groove in the valve seat providing element 91, numbered 166, is connected by one or more radial ports 167 with the internal chamber 95 in the valve seat providing element 91, and is connected by the conduit 86, as previously explained, with a point in the valve casing 84. Similarly, connections 82, 83 communicate with the internal chamber in the valve-seat-providing element 143; and said chamber, through connection 83 and the conduit V, communicates continuously with the interior of the bellows 58. The arrangements for effecting the connection between the conduits 82 and 86 may now be described.

*The rate of change-limiting control*

There is mounted on the central portion of the top of the member 56 a guideway-providing device 170 having a guide bore 171 extending longitudinally through the same, the bore being formed in a partition 172 and having plane surfaces 173 and 174 at its opposite ends. A cylindrical member 175 of the same length as the bore 171 is slidably mounted in the latter and is connected by a rod 176 with the control valve 85. Discs 178 and 179 seat, when the member 175 is in central position longitudinally of the bore 171, upon the plane surfaces 173 and 174 and also are substantially in contact with the ends of the member 175. Each of these discs is pressed against the stationary surface with which it contacts by a spring, these springs being numbered 180 and 181, and said springs resting at their ends remote from the disc with which they cooperate against adjustable followers 182 and 183 respectively, said followers being threadedly mounted in the opposite ends of the guideway providing member 170. It will therefore be apparent that it will require a predetermined force to move the valve 85 downwardly from the central position thereof shown in Fig. 8 to the lower position thereof shown in Fig. 5, and in like manner it will require a predetermined force to move it upwardly from the central position of Fig. 8 to the raised position shown in Fig. 9. The spring arrangement 181, 183 will be made such as to enable the holding of the rate of cabin pressure decrease to about one inch of mercury per minute; the spring arrangement 180, 182 to enable holding rates of cabin pressure increase to say .30 inch of mercury. The disc and spring arrangement is but illustrative of various other devices adapted normally to hold the member 175 and the valve 85 in central position and normally to require the establishment of predetermined forces before they will be moved from such positions.

A bellows 185 is fixed at its upper end to the cover 186 of a two-part casing 187 whose parts are held against relative turning, and whose interior is subjected continuously to cabin pressure, and whose overall length is adjustable by the oppositely internally threaded sleeve or coupling member 188 which cooperates with opposite threads on the upper element 189 and the lower element 190 of the casing. The lower element 190 is suitably connected by machine screws 191 or otherwise to the top of the member 170. The interior of the bellows is connected by the conduit 9 to the tank 8. The tank 8 is provided with an extremely finely orificed connection through a fitting 192 (see Fig. 12) with the interior of the cabin, so that if cabin pressure rises rapidly it will increase at a rate greater than the rate of increase in pressure in the tank 8, whereas if cabin pressure falls rapidly it may fall at a more rapid rate than the pressure change in the tank 8. The fitting 192 includes a fine passage 193, a circular groove 194 of small cross sectional area, and a further fine passage 195, and means whereby the relation of the passage 195 to the passage 193 may be changed at will by turning the disc 196 in which the groove 194 and passage 195 are formed.

When the cabin pressure is a predetermined amount higher than tank pressure, say .30 inch of mercury or more, the control valve 85 may be moved to the position shown in Fig. 9. When it is a predetermined amount lower than tank pressure, say one inch of mercury or more, the control valve 85 may be moved to the position shown in Fig. 5. When the tank and cabin pressures are approximately the same, the control valve 85 will occupy the position shown in Fig. 8. The control valve has its opposite ends connected together by a port arrangement 197 and has a stem 198 of the same cross sectional area as the operating rod 176 whereby the valve is balanced. A further connection with exterior pressure extends from the valve casing 84 at 199, being connected, as shown in Fig. 7, with the conduit 4.

The mode of operation of the illustrative embodiment of the invention will now be readily followed. It will be understood that when cabin pressure sufficiently exceeds external pressure and the interior of the bellows 58 is connected with the outside of the cabin, the cabin vent valve 44 will open. Now let us suppose that the plane takes off and rises at a rapid rate. Commencing with the time it leaves the ground and continuing until it reaches an elevation of say 8000 feet, if that be the selected height at which the bellows 123 is to function, the cabin pressure will be reduced, subject to control by the control valve 85. During the entire time the plane is rising to the predetermined elevation mentioned, the bellows 123 will remain collapsed and the pilot valve 100 will remain unseated, thus connecting the conduit 86 continuously with external pressure. However, the interior of the bellows 58 will be connected with the conduit 86 only when the conduits 82 and 86 are in communication with each other through the space between the heads of the control valve 85, and this communication will be maintained only when the cabin pressure does not drop below or exceed, by greater amounts than desired, say one inch and .30 inch of mercury respectively, the pressure in the tank 8. Accordingly, assuming that the plane is starting from the ground and that the tank and cabin pressures are equalized, there will initially be a communication between the interior of the bellows 58 and the exterior of the plane through the conduit V, conduit 82, the annular space between the heads of the control valve 85, the conduit 86, the groove 166, the radial port 167, the chamber 95, the passage 93, conduit 92 and conduit 4. The bellows 58 acts when the pressures on its opposite sides are equal to seat the valve 44, but, as soon as the pressure on its outer surface exceeds the pressure on its inner surface by a small amount, the valve is moved to its open position. Air is supplied, prior to and during flight, continuously to the interior of the cabin by a suitable pumping device and, if the valve 44 is closed, the pressure in the cabin quickly builds up to a value sufficient to open the valve 44 when the interior of the bellows 58 communicates with atmosphere. Accordingly, for a time after take-off the valve 44 will be open and the cabin pressure will follow the dropping external pressure closely. When, however, the amount of drop exceeds the desirable rate which shall have been used in determining the size and setting of the spring 181, the tank pressure, which is falling as rapidly as it is desired to have the cabin pressure fall, will lag behind the falling cabin pressure enough so that the bellows 185 will move the control valve to the position shown in Fig. 5, and thus stop the bleeding of air from the inside of the bellows 58 and interrupt cabin pressure fall by tending to cause the valve 44 to move to closed position, because air will enter the interior of the bellows from the interior of the cabin past the pilot valve 145. Thereafter, the rate at which cabin pressure will be allowed to fall will be under the control of the control valve 85, it being understood, however, that if a differential between cabin pressure and external pressure as great as is deemed safe should ever come about, the pilot mechanism P₂ would establish a connection between the inside of the bellows 58 and the external air, so that there can be no damage done to the plane. It will be evident that under the control of the bellows 185, the vent valve 44 will be caused to operate in such a manner that the cabin pressure will follow tank pressure as the latter drops, and thus maintain a comfortable rate of pressure change within the cabin.

When the cabin pressure has fallen to the value corresponding to the predetermined height, say 8000 feet, the spring 119 will be able to overcome the reduced cabin pressure acting upon the evacuated bellows and the pilot valve mechanism P₁ will then operate to maintain cabin pressure approximately constant until some greater height is reached, perhaps 35,000 feet, where the pilot mechanism P₂ will take over the control. It will be understood that while flight between the heights of 8000 feet and 35,000 feet is in progress, the cabin pressure will be maintained substantially constant and there will be no differential between tank pressure and cabin pressure sufficient to move the control valve 85 out of the central position shown in Fig. 8, so that the control of the pressure within the bellows 58 will be constantly maintained by the adjustments in position of the pilot valve element 100. When the plane goes above 35,000 feet, the pilot valve mechanism P₂ takes over control, and the spring 154 will be overcome by the differential pressure which will exist between cabin pressure and the external pressure which will prevail inside the bellows 151, and the pilot valve 145 will be opened and operate to control the pressure within the bellows 58, bleeding pressure from the interior of the latter and causing the vent valve 44 to open and thus prevent the creation of an excessive differential in pressure between the interior of the cabin and the exterior thereof. It will be observed that the communication between the interior of the bellows 58 and the exterior of the cabin which is governed by the pilot valve mechanism P₂, is not subject to control by the tank-pressure-supplied bellows 185. Accordingly, at heights above 35,000 feet the control of cabin venting will be so controlled by the pilot mechanism P₂ that overloading of the cabin supercharger and possible damage to the plane structure will be duly guarded against.

The control valve 85 has still another function. When the plane is flying at a height above a predetermined lower limit of 8000 feet, say, it will be understood that a cabin pressure approximately equal to external pressure at 8000 feet may be maintained. Now let it be supposed that the plane is to land at some elevation less than 8000 feet in approximately half an hour. In order that the passengers may be spared discomfort, it may be desirable to build up cabin pressure gradually over a substantial period, and thus to have the cabin pressure equal to the external pressure at the landing point by the time the plane reaches that place. This may be accomplished by the operator's turning the handle device 137 and adjusting the tension of the spring 119 to cause the valve 100 to be closed by the spring 119 whenever a pressure less than the desired higher cabin pressure exists. This would mean that the valve 100 would be closed immediately, resulting in a prompt closing of the cabin vent valve 44 and a tending to build up the cabin pressure too rapidly. However, this undesired event will be prevented by reason of the fact that the instant the cabin pressure exceeds, by a predetermined desired amount, say .30 inch of mercury, the pressure within the tank 8, the control valve 85 will be moved to the position shown in Fig. 9, and as a result the interior of the bellows 58 will be connected to external pressure through the conduits 199 and 4, and the valve 44 will be opened somewhat, allowing the cabin pressure to commence to drop again. From then until the tank pressure shall have increased to approximately the cabin pressure for which the spring 119 has been reset, the bellows 185 will control the position of the control valve 85 in such manner as to limit the rate of cabin pressure increase to a desired value, and the cabin pressure will therefore build up at a rate comfortably endurable by the cabin occupants, instead of at the extremely rapid rate which would occur were it not for the control by the control valve 85 of the rate of cabin pressure rise.

From the foregoing description the mode of operation of the illustrative embodiment of my invention will be readily understood. It will be appreciated that the pilot valve mechanism P₁ is adapted to maintain cabin pressure, between certain predetermined elevations, such as 8000 and 35,000 feet, relatively constant, and that were there provided no control over the cabin vent valve during the period between the moment of take off and the attainment of the airplane to 8000 feet, there might be an uncomfortable rate of diminution of cabin pressure. However, the supercontrol provided by the control valve 85 takes away the control of the bellows 58 from the valve 100 to such an extent that the rate of cabin pressure drop is held within comfortable limits. When cabin pressure attains to the desired predetermined value, such as the equivalent of external pressure at 8000 feet, the control valve 85, being governed by the difference between cabin and tank pressures, will occupy its central position of Fig. 8, and the pilot mechanism P₁ will maintain the cabin pressure substantially constant. When the plane passes above the upper predetermined level for which constant cabin pressure is desired, say 35,000 feet, the pilot mechanism P₂ will take over control and will maintain an approximately constant differential between cabin and external pressures during the operation of the plane at heights above 35,000 feet, and the control valve 85 will be unable to prevent the falling off of the cabin pressure in the manner necessary to maintain the differential mentioned. Should the plane descend rather rapidly, say from a height of 40,000 feet to a height of 35,000 feet, it would be possible for the cabin pressure to rise more rapidly than tank pressure would rise in which event the control valve 85 would be moved to the position of Fig. 9, and thus establish a direct communication through the conduit V, conduit 82, the space between the heads of the valve 85, conduit 199 and conduit 4 with the exterior of the cabin, which would mean that the valve 44 would tend to open, thus retarding the rate of building up of cabin pressure over that which might be possible under the control of the pilot mechanism P₂.

During descent of the plane from a zone where cabin pressure is maintained constant, towards a landing, the cabin pressure will increase at the same rate as the exterior pressure unless, sometime before starting to descend, the pilot valve mechanism $P_1$ is adjusted so as to cause the cabin pressure to increase to a value greater than that which corresponds to the altitude which forms the lower limit of the zone. When the plane starts to descend from the elevation of 8000 feet, the pilot mechanism $P_1$, if it is adjusted to open the valve 100 when the plane passes below 8000 feet, will operate to connect the interior of the bellows 58 with the exterior of the cabin. The valve 44 will then be regulated to permit the cabin pressure to increase at substantially the same rate as the exterior pressure. If the increase in cabin pressure is greater than .30 inch of mercury per minute, the valve 85 will move to the position of Fig. 9, but this will also connect the interior of the bellows 58 to the exterior pressure and the valve 44 will remain open. If the pilot valve mechanism is adjusted so that the valve 100 will be held closed at the elevation of the landing field and the plane continues to fly at an elevation of 8000 feet or higher, the cabin pressure will be increased at the rate of .30 inch of mercury per minute until the pressure at the elevation of the landing field is reached. When the plane descends, the cabin pressure will be held constant under the control of the pilot valve $P_1$, and the valve 85 will remain in its mid position because there will be no pressure change in the cabin to operate the bellows 185. If the plane descends before the cabin pressure reaches a value equal to that at the elevation of the landing field, the cabin pressure will continue to increase at the rate of .30 inch of mercury per minute until the exterior pressure equals that of the cabin. Thereafter they will increase at substantially the same rate, if the plane continues to descend after the cabin and external pressures are equalized. That the valve 85 may have been in its upper position when this equalization of pressures occurs will not, of course, prevent the cabin pressure rising freely at substantially the same rate with the external pressure. As long as the plane continues to descend rapidly, the cabin pressure will follow the exterior pressure but at slightly higher values. If the descent of the plane is stopped or reduced to such an extent that the rate of increase in exterior pressure is less than .30 inch of mercury per minute, the cabin pressure will continue to increase at the rate of .30 inch of mercury per minute under the control of the valve 85 until the pressure at which the pilot valve $P_1$ is set to operate is reached.

It will be understood that I have provided a very simple and compact mechanism free from compound bellows arrangements in which one bellows is movably supported by another, and having facilities for the ready adjustment of the critical pressure differentials between cabin and tank pressures independently of each other, and in which a single valve exercises a supplemental control on the pilot mechanism $P_1$ both during falling and rising of cabin pressures and in which said control valve may also control the rate of rise of cabin pressure during the early portions of descents from great altitudes. The mechanism is readily adjustable, simple in construction and effective to provide a range of controls at least equivalent to those of more complex devices.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, in an airplane cabin pressure control system, a cabin vent valve, an expansible chamber device for regulating the position of said vent valve, a tank having a restricted communication with an airplane cabin, and means for controlling the operation of said expansible chamber device including a plurality of valves one of which normally occupies a neutral position from which it is movable to control both rate of cabin pressure increase and rate of cabin pressure decrease, operating means for said one of said controlling valves including a device movable in opposite directions and subjected to opposing forces produced by cabin pressure and by tank pressure, means for yieldingly resisting movement of said last mentioned device by the preponderant one of said forces in either direction from a neutral position, said means for yieldingly resisting movement constructed and arranged to oppose to such movement in one direction from such neutral position a predetermined resistance and to such movement in the other direction from such neutral position a different predetermined resistance, and operating means for another of said controlling valves including a device subjected to opposing forces produced by cabin pressure and by a subatmospheric pressure.

2. In combination, in an airplane cabin pressure control mechanism, a valve movable to control cabin pressure, pressure responsive means for regulating the position of said valve, a tank having a restricted communication with an airplane cabin, passage means for connecting said pressure responsive means in communication with said cabin and with the space surrounding said cabin, means including a plurality of valves for controlling communication through said passage means with the space surrounding said cabin, one of said plurality of valves controlling communication between another thereof and said pressure responsive means and one of said plurality of valves also controlling communication of said pressure responsive means through said passage means with said cabin and movable to interrupt such communication past the same, operating means for one of said controlling valves including a device subjected only to opposing forces produced by cabin pressure and by tank pressure, and operating means for another of said controlling valves including only a device subjected to the opposing forces produced by cabin pressure and by a lesser pressure.

3. In combination, in an airplane cabin pressure control mechanism, a valve movable to control cabin pressure, pressure responsive means for regulating the position of said valve, a tank having a restricted communication with an airplane cabin, passage means for connecting said pressure responsive means in communication with said cabin and with the space surrounding said cabin, means including a pair of valves arranged in series in said passage means for controlling communication through the latter with the space surrounding said cabin, one of said pair of valves also controlling communication of said pressure responsive means through said passage means with said cabin and movable to interrupt such communication past the same, operating means for one of said controlling valves including a device subjected to opposing forces produced by cabin pressure and by tank pressure, and operating means for the other of said controlling valves including a device subjected to the opposing forces produced by cabin pressure and by a subatmospheric pressure.

4. In combination, in an airplane cabin pressure control mechanism, a valve movable to control cabin pressure, pressure responsive means for regulating the position of said valve, a tank having a restricted communication with an airplane cabin, passage means for connecting said pressure responsive means in communication with said cabin and with the space surrounding said cabin, means including a pair of valves arranged in series in said passage means for controlling communication through the latter with the space surrounding said cabin, one of said pair of valves nearer said pressure responsive means than the other and movable to interrupt communication between said other and said pressure responsive means, operating means for the one of said controlling valves nearer said pressure responsive means including a device movable in opposite directions from a neutral position and subjected to opposing forces produced by cabin pressure and by tank pressure, means for yieldingly opposing movement of said last mentioned device by the preponderant one of said forces in either direction from a neutral position, said means for yieldingly opposing movement constructed and arranged to oppose to such movement in one direction from such neutral position a predetermined resistance and to such movement in the other direction from such neutral position a different predetermined resistance, operating means for the other of said controlling valves including a device subjected to the opposing forces produced by cabin pressure and by a sub-atmospheric pressure, and adjustable yielding means acting to oppose the force of cabin pressure on said last mentioned device.

5. In combination, in a cabin pressure control mechanism, a cabin vent valve, pressure responsive means for controlling the operation of said vent valve, means providing a continuous restricted communication between an airplane cabin and said pressure responsive means, a tank having a restricted communication with said airplane cabin, means including a valve movable in opposite directions from a neutral position for controlling the connection of said pressure responsive means in communication with the space surrounding said cabin, means associated with said last mentioned valve whereby its opposite movements from such neutral position control the rate of cabin pressure increase and the rate of cabin pressure decrease, an expansible chamber device subjected to opposing forces produced by cabin pressure and by tank pressure for positioning said last mentioned valve, said expansible chamber device operative to actuate said valve in opposite directions from a neutral position, and means for yieldingly opposing movement of said control valve by the preponderant one of said forces in either direction from a neutral position, said means for yieldingly opposing movement constructed and arranged to oppose to such movement in one direction from such neutral position a predetermined resistance and to such movement in the other direction from such neutral position a different predetermined resistance and constructed and operating to return said valve to and hold it in neutral position when said forces are in balance.

6. In a cabin pressure control mechanism, in combination, a valve movable to control cabin pressure, pressure responsive means for regulating the position of said valve, a tank having a restricted communication with an airplane cabin, passage means for connecting said pressure responsive means in communication with said cabin and with the space surrounding said cabin, means including a pair of valves arranged in series in said passage means for controlling communication through the latter with the space surrounding said cabin, the one of said valves nearer said pressure responsive means movable in one direction from a neutral position for cutting off communication through said passage means between the other of said pair of valves and said pressure responsive means and movable in an opposite direction from such neutral position for connecting said pressure responsive means in direct communication with the space surrounding said cabin, means for yieldingly opposing movement of said last mentioned valve in opposite directions from its neutral position, said means for yieldingly opposing movement being so constructed and arranged that the resistance offered by said yielding means in one direction is different from that offered in the opposite direction, operating means for said last mentioned valve including a device subjected to opposing forces produced by cabin pressure and by tank pressure, and operating means for the other of said controlling valves including a device subjected to the opposing forces produced by cabin pressure and by a sub-atmospheric pressure.

7. In a pressure control mechanism for an airplane cabin, in combination, a cabin vent valve, pressure responsive means for controlling the operation of said vent valve, passage means for connecting said pressure responsive means in communication with said cabin and with the space surrounding said cabin, means including a pair of valves for controlling connection of said passage means with the space surrounding said cabin, control means for one of said pair of valves including a device subjected to cabin pressure and a sub-atmospheric pressure, control means for the other of said pair of valves including a device subjected to cabin pressure and exterior pressure, means including a valve movable from a neutral position in one direction for cutting off communication through said passage means to one of said pair of valves and movable in the opposite direction for connecting said passage means directly in communication with the space surrounding said cabin, and means responsive to the rate of change of pressure in said cabin for controlling said fourth valve, said last mentioned means operating to move said fourth valve in one direction when a predetermined rate of change in cabin pressure takes place and operating to move said fourth valve in the opposite direction when a different rate of change in cabin pressure takes place.

8. In a pressure control mechanism for an airplane cabin, in combination, a cabin vent valve, pressure responsive means for controlling the operation of said vent valve, passage means for connecting said pressure responsive means in communication with said cabin and with the space surrounding said cabin, means including a pair of valves for controlling connection of said passage means with the space surrounding said cabin, control means for one of said pair of valves including a device subjected to cabin pressure and a sub-atmospheric pressure, control means for the other of said pair of valves including a device subjected to cabin pressure and exterior pressure, means including a valve movable from a neutral position in one direction for cutting off communication through said passage means to the one of said pair of valves whose control means is subjected to cabin pressure and sub-atmospheric pressure and movable in the opposite direction for connecting said passage means directly in communication with the space surrounding said cabin, and means responsive to the rate of change of pressure in said cabin for controlling said fourth valve, said last mentioned means constructed and arranged to move said fourth valve in one direction when a predetermined rate of change in cabin pressure takes place and to move said fourth valve in the opposite direction when a different rate of change in cabin pressure takes place.

9. In a pressure control mechanism for an airplane cabin, in combination, a cabin vent valve, pressure responsive means for controlling the operation of said vent valve, passage means for connecting said pressure responsive means in communication with said cabin and with the space surrounding said cabin, means including a pair of valves for controlling connection of said passage means with the space surrounding said cabin, control means for one of said pair of valves including a device subjected to cabin pressure and a sub-atmospheric pressure, control means for the other of said pair of valves including a device subjected to cabin pressure and exterior pressure, means including a valve movable from a neutral position in one direction for cutting off communication through said passage means to the one of said pair of valves whose control means is subjected to cabin pressure and sub-atmospheric pressure and movable in the opposite direction for connecting said passage means directly in communication with the space surrounding said cabin, a tank having a restricted communication with the interior of said cabin, operating means for said fourth valve including a device subjected to opposing forces produced by cabin pressure and by tank pressure, and means for yieldingly opposing operation of said operating means to move said fourth valve in opposite directions from its neutral position, said means for yieldingly opposing operation so constructed and arranged that the resistance offered by said yielding means in one direction is different from that offered in the opposite direction.

10. In combination, in a pressure control mechanism for an airplane cabin, a cabin vent valve, pressure responsive means for controlling the operation of said vent valve, passage means for connecting said pressure responsive means in communication with the cabin and with the space surrounding said cabin, means including a pair of valves, one normally open and the other normally closed, for controlling the connection of said passage means with the space surrounding the cabin, means responsive to forces produced by cabin pressure and a sub-atmospheric pressure for controlling one of said pair of valves, means responsive to cabin pressure and exterior pressure for controlling the other of said pair of valves, means including a valve movable to one position for cutting off communication through said passage means to one of said pair of valves and movable to another position for connecting said passage means directly in communication with the space surrounding said cabin, and means responsive to the rate of change of pressure in said cabin for controlling said fourth valve, said last mentioned means so constructed and arranged that it is operative at a predetermined rate of pressure change for moving said fourth valve to one position and operative at a different rate of pressure change for moving said fourth valve to its other position.

11. In combination, in a pressure control mechanism for an airplane cabin, a cabin vent valve, pressure responsive means for controlling the operation of said vent valve, passage means for connecting said pressure responsive means in communication with the cabin and with the space surrounding said cabin, means including a pair of valves, one normally open and the other normally closed, for controlling the connection of said passage means with the space surrounding the cabin, means responsive to forces produced by cabin pressure and a sub-atmospheric pressure for controlling one of said pair of valves, means responsive to cabin pressure and exterior pressure for controlling the other of said pair of valves, means including a valve movable to one position for cutting off communication through said passage means to one of said pair of valves and movable in an opposite direction to another position for connecting said passage means directly in communication with the space surrounding said cabin, a tank having a restricted communication with the interior of said cabin, operating means for said fourth valve including a device subjected to opposing forces produced by cabin pressure and by tank pressure, and means yieldingly opposing operation of said operating means to move said fourth valve to its different positions, said means for yieldingly opposing operation so constructed and arranged that the resistance offered to movement of said fourth valve to one position is different from that offered to movement of said fourth valve to its other position.

LOUIS A. MAXSON.